United States Patent [19]

Davies

[11] Patent Number: 4,487,223

[45] Date of Patent: Dec. 11, 1984

[54] JETTER UNIT

[76] Inventor: Francis J. Davies, 11 Cedric St., Ivanhoe, Victoria 3, Australia

[21] Appl. No.: 374,027

[22] Filed: May 3, 1982

[30] Foreign Application Priority Data

May 4, 1981 [AU] Australia .............................. PE8694

[51] Int. Cl.³ .............................................. B08B 9/02
[52] U.S. Cl. ............................ 137/561 R; 134/166 R; 137/886
[58] Field of Search ................ 134/96, 97, 98, 166 R, 134/166 C, 171; 137/561 R, 561 A, 886; 239/581, 582

[56] References Cited

U.S. PATENT DOCUMENTS

| 1,579,069 | 3/1926 | Bork | 134/171 |
|---|---|---|---|
| 1,757,035 | 5/1930 | Beckman | 134/171 X |
| 1,946,400 | 2/1934 | Hapgood | 134/171 |
| 2,228,520 | 1/1941 | Hodsdon | 134/171 |
| 2,680,445 | 6/1954 | Hemminger | 134/171 X |
| 3,629,005 | 12/1971 | Belden | 134/171 |
| 3,810,582 | 5/1974 | Lodge | 239/582 X |
| 3,834,407 | 9/1974 | Heitman | 134/171 X |
| 4,284,243 | 8/1981 | Shaner | 137/561 A X |

FOREIGN PATENT DOCUMENTS

| 79816 | 8/1955 | Denmark | 134/166 C |
|---|---|---|---|
| 83069 | 2/1957 | Denmark | 134/166 R |
| 964735 | 5/1957 | Fed. Rep. of Germany | 134/166 R |

Primary Examiner—Gerald A. Michalsky
Attorney, Agent, or Firm—Watson, Cole, Grindle & Watson

[57] ABSTRACT

A jetter apparatus for washing the vacuum-operated teat cup assemblies of a milking machine includes a housing which supports four teat cup attachment assemblies and which defines an internal chamber therein, the housing also defining an inlet to the chamber, and a valve device which is adjustably connected to the housing so as to control the flow of washing liquid entering the chamber through the inlet. The valve device can include a valve stem which is threadingly engaged with the housing, a first end of the valve stem extending into the chamber and the second end extending outside the housing, the first end supporting a conical valve head which, upon rotation of the valve stem, with move toward and away from the inlet and thus control the flow of washing liquid which can flow into the chamber and ultimately through the teat cup attachment assemblies and into the teat cup assemblies attached thereto.

4 Claims, 2 Drawing Figures

JETTER UNIT

BACKGROUND OF THE INVENTION

1. Field of the Invention

This invention relates to the cleaning of milking machine apparatus and is particularly concerned with the construction of a jetter onto which the four teat cups are placed when the cups, claw and milk line are to be cleaned.

2. The Prior Art

Milking machine assemblies comprise a plurality of individual milking units and associated machinery to provide vacuum and collect milk. Each milking unit has four teat cups connected to a claw which is attached to the vacuum milk line.

The use of jetter units in the cleaning of milking machine equipment involves a separate pipe to carry washing liquid to the vicinity of each milking unit. Such a pipe will be herein referred to as the detergent line.

Jetter constructions are of many types but may be basically classed as either directly fixed to the detergent line or attached by means of a flexible hose, so that the jetter unit is remote from the detergent line.

A number of problems exist with the use of jetter cleaning devices and one of these occurs when a large number of milking units are provided in the milking assembly. It occurs that jetter units at the end of the line are sometimes inadequately provided with detergent and washing fluid so that effective cleaning of the teat cups positioned on those jetters does not occur.

Also, in jetter units presently available the size of the inlet to the jetter from the detergent line is quite small and it is possible that even small particles of foreign matter introduced into the detergent or washing solution can block the hole. When this occurs it requires removal of the jetter unit from the line to enable cleaning of the inlet. The problem cannot be avoided simply by larger inlet holes to the jetter.

It is an object of this invention to provide a construction of a jetter which substantially reduces or overcomes the problems associated with the present construction and method of use of jetters.

It is a further object of the invention to provide a jetter construction which more effectively cleans and washes milking equipment.

SUMMARY OF THE INVENTION

According to the invention there is provided a jetter unit comprising a housing defining a chamber, a inlet to the chamber through the housing, valve means operable from outside the housing associated with the inlet, and a plurality of outlets from the chamber, constructed and arranged whereby the valve means is operable to control the amount of liquid entering the chamber through the inlet.

In one aspect of the invention the valve means is contained within the chamber.

In a second aspect of the invention the valve means is positioned outside the chamber.

In a further embodiment of the invention the valve means may be adjusted to provide zero flow of washing liquid to the jetter unit, thus affectively closing off the jetter from the detergent line. This is particularly useful when not all of the milking units in the milking line have to be washed.

In one particularly preferred construction of jetter a valve seat is provided at the opening of the inlet in the chamber. A corresponding valve head is positioned in the chamber, having an elongated valve stem extending through the chamber and the housing wall and having at the end of the valve stem outside the chamber means for rotating the valve stem and thereby the valve head, whereby to vary the position of the valve head with relation to the valve seat.

The advantages of providing such flow control are, as pointed out above, quite substantial. Primarily they enable the inlet to an individual jetter from the detergent line to be opened substantially more or less than that for other jetters in the line to ensure that all jetter units receive equal quantities of detergent liquid. Thus it is possible to adjust jetters in a milking assembly so that those furthest from the vacuum and those closest to the vacuum still receive adequate but not excessive quantities of detergent liquid and washing liquid, which enables proper cleaning of the milking equipment.

Also, if foreign matter blocks the inlet from the detergent line, it is possible to open the inlet to its maximum opening and allow such foreign matter to be drawn into and through the jetter. In the case where the material blocking the opening is particularly large it may not be possible to flush such a large piece of material through the opening, but, in most cases, it has been found that the opening may be cleared by fully opening the valve, thereby avoiding the removal of the jetter unit from the detergent lined.

DESCRIPTION OF THE DRAWINGS

The invention will be further described with reference to a preferred construction of a jetter of the invention, as shown in the accompanying drawings, in which.

DETAILED DESCRIPTION OF THE PREFERRED EMBODIMENT

Figure 1:
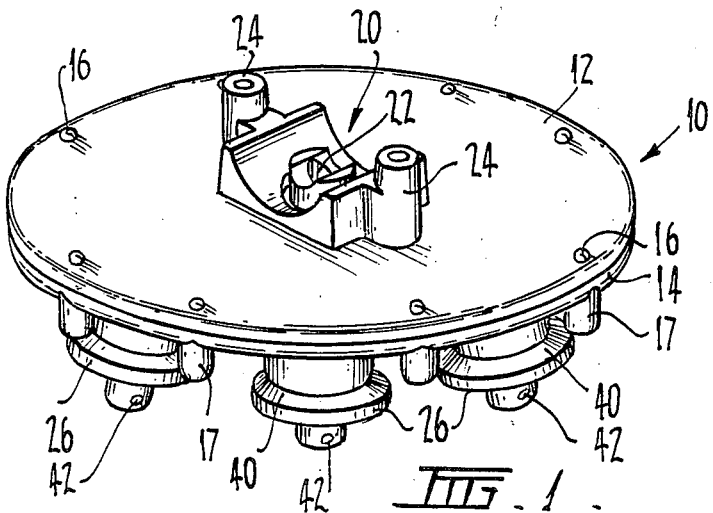
FIG. 1 is a top view of an assembled jetter unit of the invention.

Referring to FIG. 1 there is seen a jetter 10 composed of a planar back housing 12 and a dished front housing 14, retained together by a plurality of screws 16. Screws 16 pass through back housing 12 and are received in stub portions 17 formed integrally on front housing 14. Between the two housings a peripheral sealing ring 18 (seen in FIG. 2) is positioned to provide a seal between housings 12 and 14 when assembled.

On back housing 12 there is shown the seat portion of a pipe mounting bracket 20, having an upstanding hollow stub 22 which, in use, locates in a hole provided in the pipe carrying detergent and/or washing solution to jetter 10. The hole in stub 22 comprises the inlet 23 to the jetter and is centrally located in housing 12. A saddle member (not shown) clamps the pipe onto seat 20 and jetter 10 is retained on the pipe by two screws which pass through the saddle bracket and locate in posts 24.

Teat cup retaining means 26 are provided on front housing 14.

Figure 2:
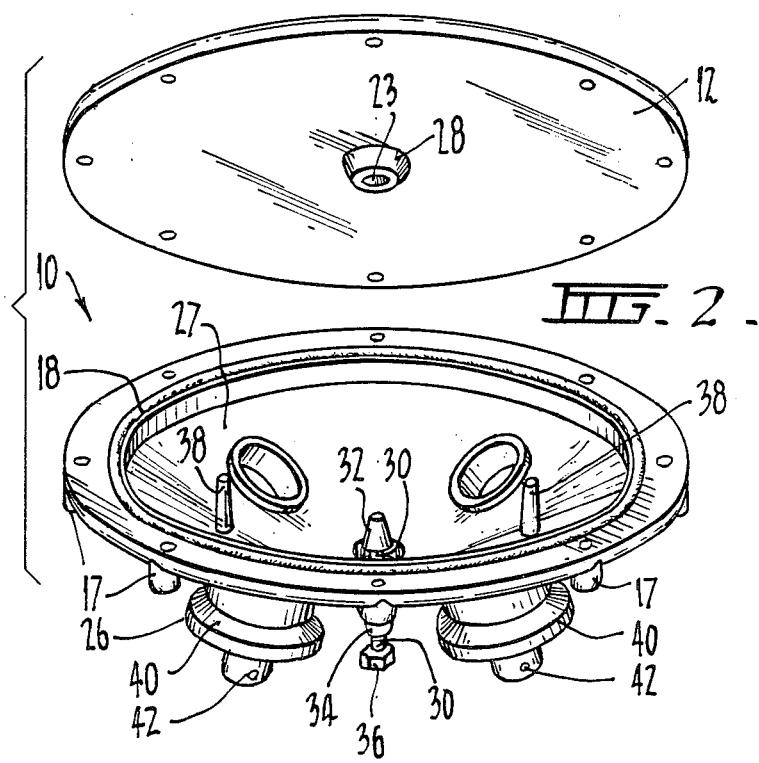
FIG. 2 is a view showing the jetter unit of FIG. 1 with the back and front housing portions separated.

Referring now to FIG. 2 there can be seen chamber 27, formed by housings 12 and 14. On back housing 12 a raised valve seat 28 surrounds inlet 23.

Centrally positioned in front housing 14 is a valve stem 30 having a conical valve head 32 positioned thereon. Valve stem 30 is screw threaded and extends out of chamber 27 through a threaded stem support member 34, formed integrally with housing 14. An integral nut 36 on the end of valve stem 34 allows rotation of the valve assembly, whereby to vary the relationship of the valve head 32 and the valve seat 28.

Also seen are two upstanding spacer members 38 which prevent any significant movement of housing 12 and 14 under the vacuum present during operation of jetter 10.

The jetter shown in the drawings is designed to be mounted so that the four teat cups used in the milking process hang downwardly from the teat cup retainer means 26. The flange 40 provided on the means 26 is dimensioned to allow the teat cup to be positioned thereon and to retain the teat cup when hanging therefrom under its own weight, thereby allowing the cups and claw assembly to hang from the four flanges 40 during the cleaning operation.

It is known to provide different configurations of teat cup retaining means which allow for a low-level mounting of the jetter unit whereby the teat cups are dropped onto the teat cup retaining means and are prevented from disengaging therefrom by extended stems provided thereon. Such variations to the teat cup retaining means are known to those skilled in this art.

In both cases the teat cup retaining means provide for an air tight seal with the teat cups.

As will be appreciated by those skilled in the art the jetter 10 operates by using the vacuum normally applied during the milking operation. The four milking teat cups are positioned on the teat cup retaining means 26 and the vacuum applied to the milking plant to be cleaned, in the normal way, that is, through the teat cups. This has the effect of drawing washing liquid, provided to the pipe to which jetter 10 is attached and connected, through inlet 23 and into chamber 27. Each of the teat cup retaining means 26 is provided with a plurality of small holes 42 through which the washing liquid is drawn into the teat cups. In this way the cleaning and washing action is achieved.

There are a number of factors which affect the satisfactory performance of jetter 10 in its cleaning and washing role. In particular, is the amount of vacuum provided to draw liquid through inlet 23. It can be seen that a number of things may effect the vacuum available at a particular jetter and two factors are firstly, the distance of the jetter unit from the source of vacuum and, secondly, the vacuum loss due to inbuilt factors in the milking plant, such as the configuration of the plant itself.

By adjusting the size of inlet 23 on all of the jetters in the milking plant it is possible to provide a substantially equal effective vacuum to each jetter, so that each jetter is able to have drawn therethrough an equal amount of washing liquid which is distributed to each teat and claw set, during the washing cycle. Also, as indicated above, inlet 23 may be closed by seating valve head 32 on the valve seat 28, and this is particularly useful if one or more jetters are not being used to clean milking equipment.

In addition to a construction of jetter in which the valve means is contained within chamber 27 it is possible to provide a construction of jetter in which the valve means is located outside chamber 27. For example, it may be desirable to provide an extension fitting positioned between inlet 23 in chamber 27 and the pipe carrying the detergent or washing liquid. In such a case the valve means may be provided in that extension fitting and may be integral with the housing. As such the valve means would be operable from outside the chamber.

There is a further advantage of the jetter of the invention which will be readily seen by those skilled in the art. Since milking units are washed twice a day it is highly desirable to provide maximum cleaning and washing efficiency with a minimum quantity of cleaning liquid. In that regard the construction of jetter of the present invention enables the flow rate of liquid entering each jetter unit to be controlled to provide maximum time for the washing cycle, using a minimum quantity of cleaning liquid. Individual State Dairy Industry control regulations throughout Australia provide minimum quantities of washing liquid which should pass through each milking unit set, and it has been most difficult to obtain satisfactory cleaning of equipment with the stated minimum quantities. Until the use of a jetter in accordance with the present invention it was found that 2.5 to 3 liters of detergent liquid could pass through a single jetter unit and teat and claw assembly in little more than 15 seconds. However, by using the jetter of the invention described above and providing control of the flow rate through adjustment of the valve on the inlet, it has been possible to extend the washing time to from 1.75 to 2 minutes for the passing of 2.5 to 3 liters of detergent liquid through each milking unit set. It has been found that a substantial superior cleaning and washing effect is achieved by the longer duration of the cleaning cycle.

I claim:

1. In a jetter apparatus for washing vacuum-operated teat cup assemblies of a milking machine, said apparatus including a housing comprising separate, interconnected front and back housing parts, said front and back housing parts defining a chamber therebetween, said back housing part including an inlet communicating with the chamber, means to connect said inlet to supply washing liquid thereto, and a plurality of teat cup attachment means connected to said front housing part, the improvement wherein said housing includes a valve means, said valve means comprising a valve stem which extends through said front housing part such that a first end is located within the chamber and a second end is located outside of said housing, said valve stem being adjustably positionable with respect to said front housing part such that the first end thereof is movable within the chamber toward and away from the inlet in said back housing part and thereby controlling the flow of washing liquid through the inlet and into the chamber in said housing and thus through said teat cup attachment means connected to said front housing part.

2. The jetter apparatus as defined in claim 1 wherein said valve means includes an annular valve seat which is attached to said back housing part to extend into the chamber in said housing, said annular valve seat surrounding said inlet, and wherein said second end of said valve stem includes a conical valve head which is capable of sealing engagement with said annular valve seat.

3. The jetter apparatus as defined in claim 1 wherein said valve stem is threadingly engaged with the front housing part of said housing and wherein said second end of said valve stem includes means to facilitate rotation of said valve stem.

4. The jetter apparatus as defined in claim 1 wherein four teat cup attachment means are connected to said front housing part.

* * * * *